March 21, 1933.  H. RAWDON ET AL  1,902,421
SHOCK ABSORBER
Filed Oct. 23, 1929
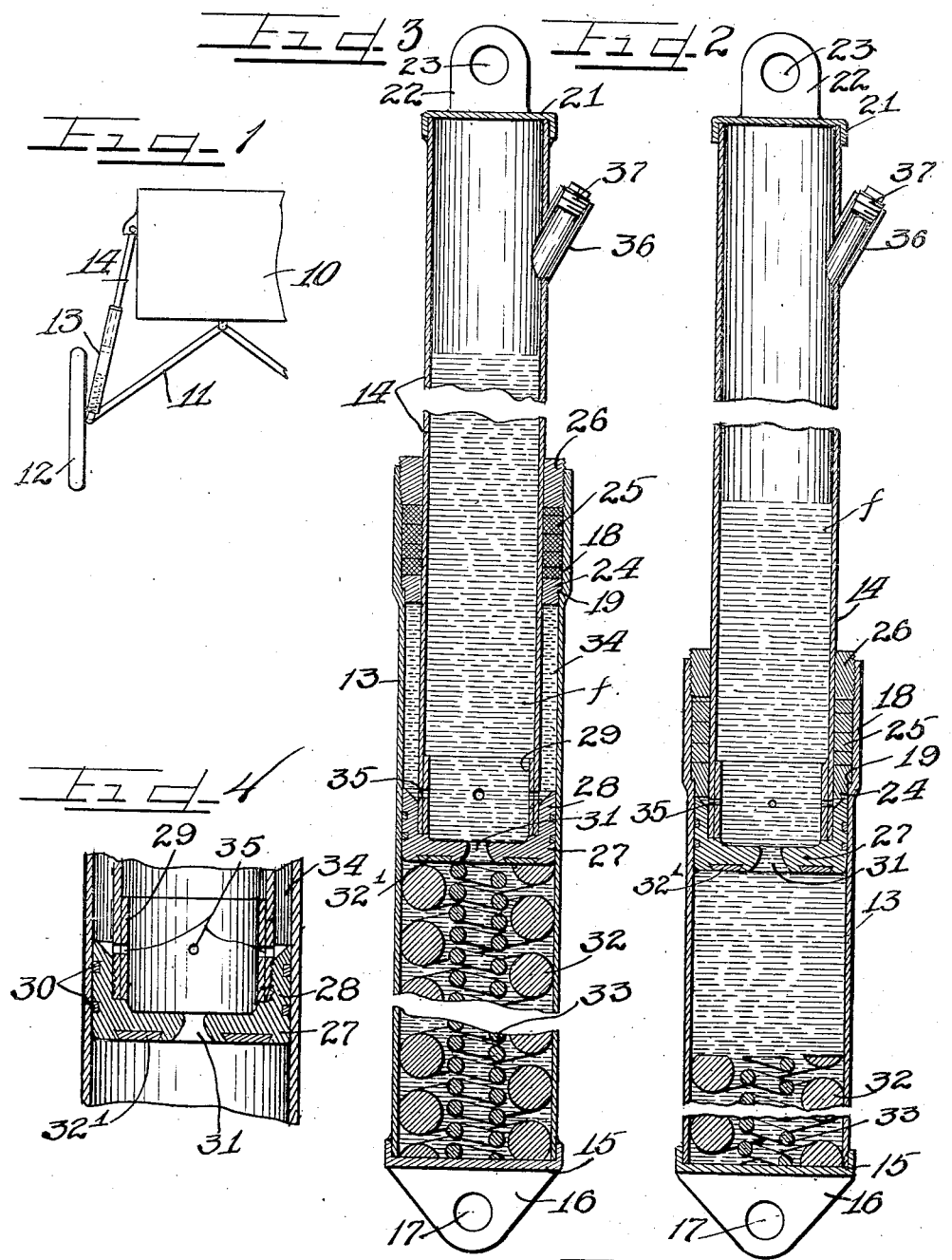
Inventors
Herbert Rawdon.
Walter E. Burnham.
By Charles R. Wills Attys.

Patented Mar. 21, 1933

1,902,421

UNITED STATES PATENT OFFICE.

HERBERT RAWDON AND WALTER E. BURNHAM, OF WICHITA, KANSAS, ASSIGNORS TO TRAVEL AIR COMPANY, A CORPORATION OF DELAWARE

SHOCK ABSORBER

Application filed October 23, 1929. Serial No. 401,748.

Our invention relates to a shock absorber structure and particularly to shock absorbing trusses to be used in the landing gear for aeroplanes.

Our shock absorber is of the type comprising a cylinder member and a plunger member having a piston for engaging in the cylinder member, together with a fluid in the cylinder restricted in its flow through or past the piston, and a spring for resisting approach of the members.

In all prior structures of this type of which we are aware, the approach of the members, i. e. the relative movement of the members toward each other, is resisted at all times by spring means and, in some instances, by both spring means and restricted flow of a fluid.

One of the important objects of this invention is to so construct and apply our shock absorber strut, as for example, to the landing gear of an aeroplane, that, when there is no pressure against the wheels, as, for instance, when the aeroplane is in flight, the plunger member will be separated by a substantial distance from the shock absorbing spring, in order that, when pressure is suddenly applied to the wheel, as when the aeroplane lands, the impact shock will be absorbed primarily in greater part by the fluid flow resistance through properly designed and restricted ports or passageways, with the spring coming into engagement and operation only toward the end of relative movement of the strut members, the shock of impact having been practically all absorbed by the hydraulic resistance, and the spring then functioning mainly to absorb the minor shocks, as for example, when the aeroplane is taxiing along the ground.

In prior structures of this class, the fluid flow resisting passageways are usually in the form of straight cylindrical bores, and we have found that under heavy pressure flow of fluids through such bores, the edges soon become worn so that the calibration and the rate of flow materially changes, and the efficiency of the shock absorbing structure is considerably impaired.

Another important object of this invention is, therefore, to provide an orifice of such design that the flow therethrough may be accurately computed and calibrated for smooth and unbroken flow and that wear will be substantially eliminated and the proper calibration maintained indefinitely.

The above features and other features of construction are incorporated in the structure disclosed on the drawing, in which drawing:

Figure 1 is a more or less diagrammatic view showing the application of our improved shock absorber strut to the landing gear of an aeroplane, Figure 2 is an enlarged diametrical sectional view of the strut, showing it in expanded position, or the position assumed by its members when the aeroplane is off the ground, Figure 3 is a similar diametrical section showing the operation of the shock absorber for taking up the landing impact, and Figure 4 is an enlarged diametrical sectional view of the piston structure.

Referring to Figure 1, 10 represents the fuselage or body of an aeroplane to which the landing gear is secured. Ordinary struts 11 extend from the axle of the wheels 12 and allow the wheels to move vertically relative to the body. Our improved shock absorbing strut comprises a cylinder member 13 and a plunger member 14, and between each wheel and the aeroplane body is interposed one or more of such shock absorber struts, the plunger end being preferably connected to the body and the cylinder end with the wheels.

Describing now the shock absorber strut in detail, the cylinder is in the form of a cylindrical shell or tube closed at its lower end by a cap 15 having a rib 16 provided with a bolt hole 17, so that the cylinder member may be readily connected with the wheel. The inner end section 18 of the cylinder member is thickened or reinforced and is radially expanded to provide the annular internal shoulder 19.

The plunger member shown is in the form of a cylindrical shell or tube 20 of less diameter than the cylinder member. The outer end of the plunger tube is closed by a cap 21 having a rib 22 provided with a bolt hole 23, so that the structure member may be secured to the aeroplane body. The plunger member is surrounded by a metal ring 24, which seats on the shoulder 19 of the cylinder member and supports the packing 25 surrounding the plunger member within the end 18 of the cylinder member. An annular pressure ring 26 surrounds the plunger tube and has threaded engagement in the end of the cylinder section 18, so that the packing material may be properly compressed to seal the sliding connection between the members against the escape of the fluids.

At the inner end of the plunger tube is a piston structure comprising the head 27, and the annular flange 28 by means of which the structure may be secured to the end of the plunger tube. As shown in Figure 4, the piston structure may be secured by the threaded engagement of its flange with the threaded lower end of the plunger tube, and, to strengthen the structure at this point, a reinforcing ring or sleeve 29 may be inserted in the plunger tube. The piston structure fits the bore of the cylinder member, and to prevent leakage past the piston structure, piston or packing rings 30 may be provided.

In the piston head is the port or orifice 31 for the restricted flow of oil between the cylinder and plunger members as the device is lengthened or shortened during service. In accordance with our invention, this orifice is made conical or nozzle-shaped, with its edges well-rounded and with its wide end at the outer side of the piston head. An orifice of this shape can be accurately computed and calibrated for the desired flow in either direction therethrough and the flow therethrough is smooth and regular and devoid of eddy and wire drawing currents which are incidental to the flow through the ordinary cylindrical bore and which soon wear away and destroy the calibration of such bore.

Within the cylinder member 13 is a helical spring 32 against which the plunger member abuts after moving a distance in the cylinder member, a steel insert 32' in the piston head taking up the wear due to contact of the spring on the piston head. For heavier service an additional spring 33 may be provided which may be nested within the spring 32, as shown.

The normal position of our improved strut is shown in Figure 2, the plunger and cylinder members being positioned with the plunger member displaced from the spring. When the strut is applied to an aeroplane, as shown in Figure 1, the strut is fully extended, the weight of the axle and wheel being supported by the engagement of the piston structure with the packing retainer ring 24.

As the absorber strut is shortened and lenthened, it will cause corresponding variation in the volume of the space 34 between the plunger and cylinder members. This space could, of course, be vented by a suitable air vent (not shown) leading from the upper part thereof. However, we prefer to connect this space for oil flow, and we, therefore, provide one or more passages or ports 35 through the wall of the plunger member for connecting the space 34 with the interior of the plunger member for the interflow of oil. These passageways are preferably located below the outer edge of the piston structure flange 28, the flange having its inner edge cut away, as shown, to provide communication of the passageways with the space 34. With this arrangement, as the strut lengthens to bring the piston against the packing, the oil within the space 34 will be forced through the passageways 35 into the plunger member.

The plunger member has a suitable oil supply inlet 36 having a closure plate 37.

Describing now the operation, the strut is applied so that it is normally fully extended. When applied to an aeroplane, as shown in Figure 1, the weight of the supported wheel will hold the strut fully extended, as indicated in Figure 2, there being then a considerable space intervening between the piston structure and the shock absorber spring in the cylinder member. Upon landing, the first shock as the wheels strike the ground causes the strut to shorten by the movement of the plunger member downwardly in the cylinder member. This movement is accompanied by the forced flow of oil from the cylinder member into the plunger member through the orifice 31. Movement of the plunger member into the cylinder member also increases the volume of the space 34 and this introduces further resistance to the relative movement of the absorber members, which resistance is, however, gauged by the area of the passageways 35. As the volume of the space 34 increases, oil will flow into the space from the plunger structure through the passageway 35.

After the restricted flow of oil through the orifice 31 and passageways 35 gradually brakes the relative movement between the strut members, and after the kinetic energy of the impact has been practically all absorbed hydraulically, the plunger member will reach the springs 32 and 33, which will then receive whatever impact energy is left and will assist the hydraulic means in the final absorption thereof. In other words, the spring may function to assist the hydraulic means in taking up the tail end of the landing impact. In our arrangement, the spring is relied upon mainly to absorb the taxiing shock, the plunger structure, during taxiing, riding constantly on the spring, so that the spring equalizies the unevenness of the ground over which the plane is taxiing. During such taxiing, the spring is assisted more or less hydraulically by the restricted back and forth flow of oil through the orifice 31 and through the passageway 35.

When the aeroplane takes off, the compressed spring, together with the weight of the released wheel, will tend to recoil or extend the strut. Such recoil movement is retarded and dampened by the restricted oil flow through the piston orifice 31, and particularly by the restricted flow through the passages 35 in relieving the pressure on the oil in the space 34 as the piston approaches the packing ring as the strut is extended.

With the orifice 31 formed and arranged as shown and described, the oil, under the heavy sudden pressure of impact of the plane with the ground, will be properly restricted in its flow, but the flow will be regular and smooth and devoid of disturbing eddy or cross currents, and, as there are no sharp corners in the path of the oil, there will be no wear on the structure, and the orifice will always maintain its proper calibration and resistance under the varying pressure conditions.

Thus, in our improved structure, we depend in the main upon the hydraulic resistance for dampening and absorbing the shock of impact, and the spring resistance is depended upon mainly for absorbing and smoothing out taxiing shocks. The nozzle-shaped orifice through the piston causes a smooth and unbroken, though very rapid, flow of fluid from one side of the piston to the other as the shock absorber members are suddenly brought together, and the rounded approach of the orifice prevents wearing away of the piston material by the rapidly flowing fluid.

We do not desire to be limited to the precise structure and arrangement shown and described, as changes and modifications are possible without departing from the scope and principles of the invention.

We claim as follows:

1. A shock absorber comprising a cylindrical member closed at its outer end; a tubular plunger member concentric with but of less diameter than the cylindrical member telescoped therein; a piston secured to said plunger member, engaging a wall of the cylindrical member, and having a convergent orifice therethrough for allowing the restricted flow of fluid between the cylindrical member and the plunger member; a shock absorbing spring at the outer end of said cylindrical member, said plunger member being adapted to be moved outwardly with its piston a distance away from said spring, whereby upon sudden movement of said plunger member into the cylindrical member such movement would be primarily dampened solely by the resistance to flow through said orifice and eventually assisted by the engagement of the plunger member with the spring; and relatively hard inserts in said piston head for taking up the wear due to the contact of the spring on the piston head.

2. A shock absorber comprising a cylindrical member closed at its outer end; a tubular member concentric with but of less diameter than said cylindrical member telescoped therein and adapted at times to form a space between the outer walls of the tubular member and the inner walls of the cylindrical member; a piston positioned at the inner end of said plunger member, having an annular flange surrounding the inner end of said plunger member, having a convergent orifice therethrough for allowing the restricted flow of fluid between the cylindrical member and the plunger member, and so formed that both the piston and the flange engage the walls of the cylindrical member; fluid in said members; said plunger being formed with an orifice passageway between the interior of said plunger member and said space at a point adjacent to the upper end of said flange for allowing the restricted flow of fluid between the interior of said plunger member and said space; said flange having a beveled upper end aligned with said orifice passageway.

In testimony whereof we have hereunto subscribed our names at Wichita, Sedgwick County, Kansas.

HERBERT RAWDON.
WALTER E. BURNHAM.